United States Patent [19]
Villarreal

[11] Patent Number: 5,947,741
[45] Date of Patent: Sep. 7, 1999

[54] TWENTY-SIX SIDED GAME BALL

[76] Inventor: Gerard L. Villarreal, 10343 Sahara, San Antonio, Tex. 78216

[21] Appl. No.: 08/948,689

[22] Filed: Oct. 10, 1997

Related U.S. Application Data

[60] Provisional application No. 60/028,629, Oct. 16, 1996.

[51] Int. Cl.⁶ .................................................. G09B 1/36
[52] U.S. Cl. ........................................... 434/171; 434/159
[58] Field of Search .................................... 434/128, 171, 434/172, 174, 159; 273/146; 446/122

[56] References Cited

U.S. PATENT DOCUMENTS

| | | |
|---|---|---|
| 217,978 | 10/1879 | Hill . |
| 1,477,255 | 12/1923 | Fritz . |
| 1,586,429 | 5/1926 | Kiesling . |
| 3,391,476 | 7/1968 | Sher . |
| 3,811,206 | 5/1974 | Gaccetta .................................. 434/159 |
| 3,858,333 | 1/1975 | Kopp ..................................... 373/146 X |
| 3,873,096 | 3/1975 | Shoptaugh . |
| 4,055,348 | 10/1977 | Marzoni, Jr. . |
| 4,188,734 | 2/1980 | Rich ....................................... 434/159 |
| 4,258,479 | 3/1981 | Roane . |
| 4,378,117 | 3/1983 | Rubik . |
| 4,437,667 | 3/1984 | Miller . |
| 4,936,780 | 6/1990 | Cogliano . |
| 4,950,165 | 8/1990 | Machaalani . |
| 5,013,245 | 5/1991 | Benedict . |
| 5,167,503 | 12/1992 | Jordan . |
| 5,224,710 | 7/1993 | Feokhari ................................. 273/247 |
| 5,275,567 | 1/1994 | Whitfield . |
| 5,337,501 | 8/1994 | Amanze . |
| 5,405,135 | 4/1995 | Embro . |
| 5,716,212 | 2/1998 | Lee ......................................... 434/159 |

*Primary Examiner*—Kien T. Nguyen
*Attorney, Agent, or Firm*—Royston, Rayzor, Vickery, Novak & Druce, L.L.P.

[57] ABSTRACT

A game piece for language related play having a plurality of flat exterior surfaces that are equal in number to the number of letters in the alphabet of a particular language. All of the letters of the particular language are displayed on the body so that one letter is on each flat exterior surface. Optionally, a corresponding braille character and/or a corresponding sign-language character may be displayed adjacent to each letter on the same flat exterior surface. In one embodiment, the language is English and the plurality of flat exterior surfaces number twenty-six.

19 Claims, 2 Drawing Sheets

TWENTY-SIX SIDED GAME BALL

This application claims the benefit under 35 U.S.C. 119(e) of U.S. Provisional Application No. 60/028,629 filed Oct. 16, 1996.

FIELD OF THE INVENTION

This invention relates generally to educational games. More particularly, the present invention relates to shaped figures having discrete faces upon which letters, numbers or symbols may be placed for use during educational play. In one particularly preferred embodiment, the present invention has twenty-six faces oriented on a solid commonly referred to as a great rhombicuboctahedron or truncated cuboctahedron. The fact that these shapes have twenty-six faces is important when considering the shape for applying the twenty-six letters of the English alphabet. Furthermore, these shapes are generally "ball" shaped, easily used in play, and are inherent inducements to children to encourage their use as play objects.

BACKGROUND OF THE INVENTION

The use of toys as educational tools is well known in adolescent fields. If a child can be encouraged to play with a particular toy or object, that child is more likely to be receptive to messages that are conveyed therethrough. This is particularly true if the toy can be utilized in an engaging game that draws their attention and fosters concentration.

Several devices are known that embody different shapes and body portions having letters arranged thereon. One example is found in U.S. Pat. No. 4,437,667 issued to Miller on Mar. 20, 1984 for a Geometric Game. Therein, a RUBIK's CUBE style device is utilized with letters fixed to the exterior individual faces of each of the component blocks of the CUBE. By arranging the several different blocks, words and/or phrases may be established. Another teaching game is disclosed in U.S. Pat. No. 5,275,567 that issued Jan. 4, 1994 to Whitfield for a Toy Building Block For Teaching Braille. Therein, cube shaped blocks are provided having conventional English letters and their Braille equivalents located either on the same face or on a different face with the purpose being to assist in teaching children the Braille system of reading. It is also contemplated that words and/or symbols having Braille equivalents may also be embodied on the blocks for similar purposes. Another example is found in U.S. Pat. No. 4,055,348 issued Oct. 25, 1977 to Marzoni, Jr. for a Word Building Game. This invention discloses icosahedral-shaped dice that are useable in combination in word construction games. The specific embodiment of the disclosure includes five icosahedral-shaped dice thereby establishing a collective one-hundred faces up on which letters may be placed on the five twenty-sided figures. In yet another example, U.S. Pat. No. 1,586,429 that issued May 25, 1926 to Kiesling for a Cross Word Puzzle Game discloses a twenty-sided figure that is used like a die on a game board for word spelling purposes.

In each of the known devices described herein immediately above, none provide a shape, particularly a symmetrical and generally ball shape having twenty-six sides which are advantageously configured to receive a single letter of the English alphabet on an individual base or facet. As a result, a need for an improved structure for educational play has been recognized and addressed in the present invention which is disclosed hereinbelow.

DESCRIPTION OF THE INVENTION

Figure 1:
FIG. 1 is a perspective view of the present invention embodied in a great rhombicuboctahedron or truncated cuboctahedron.

As previously stated, the present invention is intended to be utilized for educational play purposes with children and adults desiring an educational distraction. It is particularly applicable in the adolescent environment where children need to be taught alphabetical skills that are presented in an attracted forum when placed in a game setting. While it is believed that use of the present invention will be primarily by children, often together with adults, it is also anticipated that mentally challenged persons and adults playing with one another will similarly enjoy practicing the game. One feature of this game piece is its exactly twenty-six faces in one embodiment. Furthermore, in a preferred embodiment the shape is a great rhombicuboctahedron 60 which is symmetrical about a center line and generally configured in a ball or flattened sphere. In an alternative preferred embodiment, the invention takes the shape of a small rhombicuboctahedron 45. In the preferred embodiment, the game piece 10 has seventy-two edges, forty-eight vertices and twenty-six faces 20 as required for the twenty-six letter English alphabet. In the alternative preferred embodiment the device 10 has forty-eight edges, twenty-four vertices and twenty-six faces 20 as required for the twenty-six letters in the English alphabet. In the example of the truncated cuboctahedron 60, six octahedrons 65 are circumferentially established across select diameters of the body 15. These six faces provide advantageous locations for random placement of the six vowels of the English alphabet. In either embodiment, the dimensions of the body 15 are geometrically correlated so that an overall height of the body may be calculated given any particular side or edge length. This feature is probably more important from a reverse standpoint; that is calculation of the length of side (L) based on a desired overall body's 15 width or heigth of the game piece 10.

The symmetrical aspects of the solid body 15 are important in that it permits the provision of a substantially round body 15 that can be easily used for play purposes or like a die for random selection of any one of the twenty-six letters 25 or any representation of the complete English Alphabet.

Because the embodiments of the present invention may be of suitable sizes to be used as a ball, it may be tossed between several players. In this manner, motor skills of the participating children will also be developed and enhanced in ways such as improving hand-eye coordination.

Figure 5:
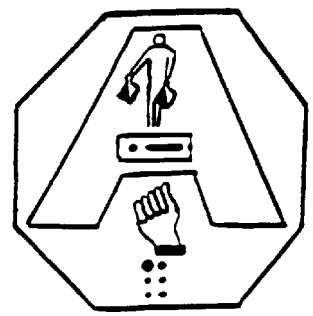
FIG. 5 is a sample of an individual surface showing alternate representations of the letter "A".
Figure 1:
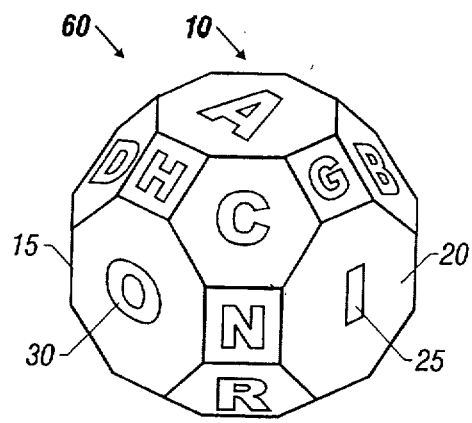
Figure 2:
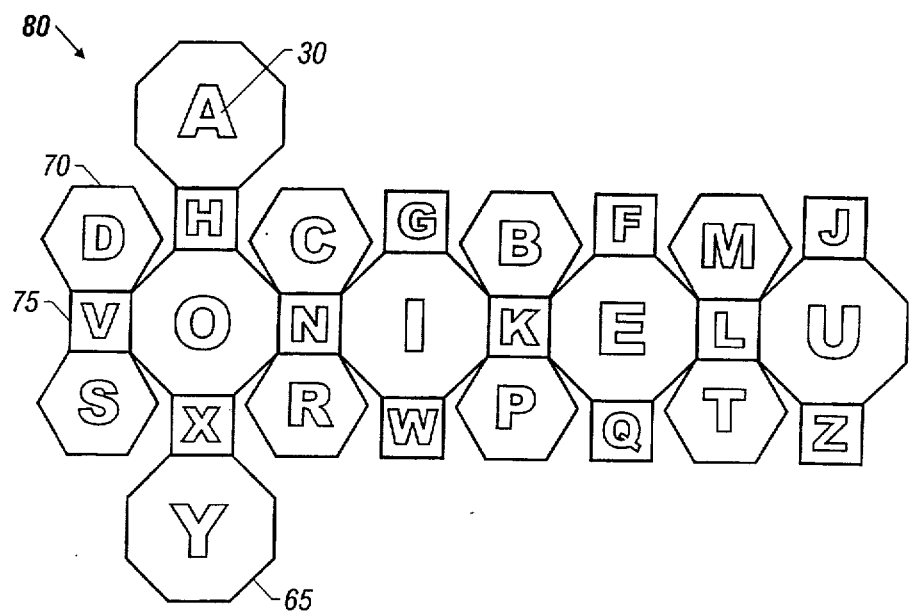
Figure 3:
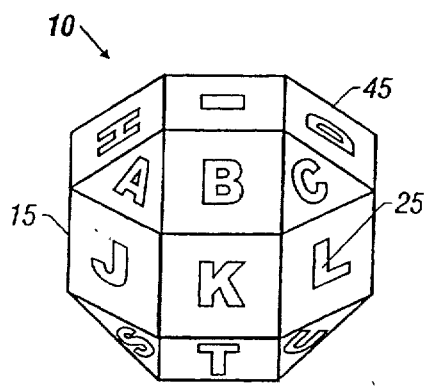
Figure 4:
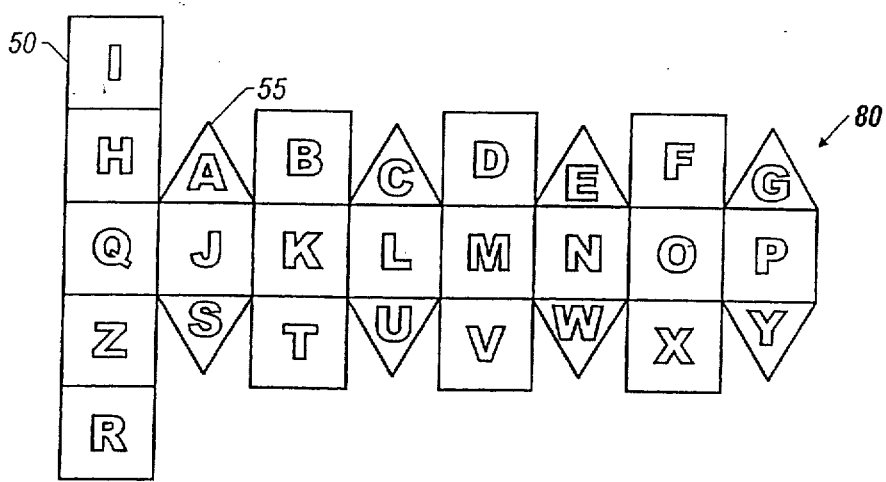
Figure 5:
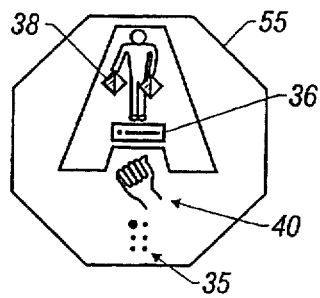

In at least one embodiment, the present invention is a game piece 10 for language related play. The game piece 10 has a body 15 having a plurality of flat exterior surfaces 20 that are equal in number to the number of letters 25 in the alphabet of a particular language. All of the letters 25 of the particular language are displayed on the body 15 so that one letter 25 is on each flat exterior surface 20. Optionally, a corresponding braille character 35 and/or a corresponding sign-language character 40 may be displayed adjacent to each letter 25 on the same flat exterior surface 20. Preferably, the braille character 35 or other tactile representation on each surface 20 is similarly located with respect to the other characters for consistent orientation by the user. In the example of FIG. 5, this location is at a lowermost position on the surface 20. Still further, a corresponding morse code 36 and/or semaphore 38 representation may be included on the surface 20.

In one embodiment, the particular language is English and the plurality of flat exterior surfaces 20 number twenty-six. In an alternate of this embodiment, the body 15 has a rhombicuboctahedron 45 shape which is also called a small rhombicuboctahedron. In this shape, there are eighteen square-shaped 50 surfaces and eight triangular-shaped 55 surfaces. In another version of this embodiment, the game piece body 15 has a great rhombicuboctahedron 60 shape. In this shape, there are six octahedron-shaped surfaces 65, eight hexagon-shaped surfaces 70, and twelve square-shaped surfaces 75. In this configuration, one of the six English vowel letters 25 is displayed on each of the six octahedron-shaped surfaces 65. In either shaped embodiment, the body 15 may be in the form of a solid constructed from plastic or wood. Alternatively, the body may be hollow and constructed from plastic or one or more pieces of foldable paper 80.

The relationships of the various dimensions of the great and small rhombicuboctahedron 60 and 45 are complex, but useful in the construction of an appropriate body 15 for the present invention. When forming such a body, exterior dimensions, as well as surface area and volumes will be important from a manufacturing and materials standpoint.

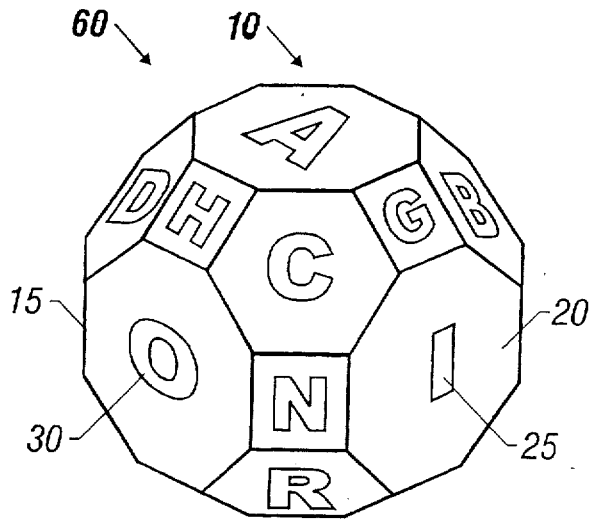

What is claimed and desired to be secured by Letters Patent is as follows:

1. A game piece for language related play; said game piece comprising:
    a body having a plurality of flat exterior surfaces, said plurality of exterior surfaces equal in number to the number of letters in the alphabet of a particular language and said body having a small rhombicuboctahedron shape; and
    all letters of said particular language being displayed on said body, one of said letters on each flat exterior surface.

2. The game piece for language related play as recited in claim 1; wherein a corresponding morse code representation is displayed adjacent to each letter on the same flat exterior surface.

3. The game piece for language related play as recited in claim 1; wherein a corresponding semaphore code representation is displayed adjacent to each letter on the same flat exterior surface.

4. The game piece for language related play as recited in claim 1; wherein a corresponding tactile representation is displayed adjacent to each letter on the same flat exterior surface.

5. The game piece for language related play as recited in claim 4; wherein said tactile representation is a braille character located in a lowermost position upon the flat exterior surface.

6. The game piece for language related play as recited in claim 1; wherein a corresponding sign-language character is displayed adjacent to each letter on the same flat exterior surface.

7. The game piece for language related play as recited in claim 1; wherein said particular language is English.

8. The game piece for language related play as recited in claim 1; wherein said plurality of flat exterior surfaces comprise twenty-six flat surfaces.

9. The game piece for language related play as recited in claim 8; wherein said particular language is English having twenty-six letters.

10. The game piece for language related play as recited in claim 1, wherein said plurality of flat exterior surfaces comprises eighteen square-shaped surfaces and eight triangular-shaped surfaces.

11. The game piece for language related play as recited in claim 1; wherein said body is a solid constructed from plastic.

12. The game piece for language related play as recited in claim 1; wherein said body is constructed from wood.

13. The game piece for language related play as recited in claim 1; wherein said body is constructed from foam rubber.

14. A game piece for language related play; said game piece comprising:
    a body having a plurality of flat exterior surfaces, said plurality of exterior surfaces equal in number to the number of letters in the alphabet of a particular language and said body having a great rhombicuboctahedron shape; and
    all letters of said particular language being displayed on said body, one of said letters on each flat exterior surface.

15. The game piece for language related play as recited in claim 14; wherein said plurality of flat exterior surfaces comprises six octahedron-shaped surfaces and eight hexagon-shaped surfaces.

16. The game piece for language related play as recited in claim 15; wherein one of six English vowel letters is displayed on each of said six octahedron-shaped surfaces.

17. The game piece for language related play as recited in claim 14; wherein said plurality of flat exterior surfaces comprises twelve square-shaped surfaces.

18. A game piece for language related play; said game piece comprising:
    a body having a plurality of flat exterior surfaces, said plurality of exterior surfaces equal in number to the number of letters in the alphabet of a particular language and said body being hollow and constructed from plastic; and
    all letters of said particular language being displayed on said body, one of said letters on each flat exterior surface.

19. A game piece for language related play; said game piece comprising:
    a body having a plurality of flat exterior surfaces, said plurality of exterior surfaces equal in number to the number of letters in the alphabet of a particular language and, said body being formed from a single piece of foldable paper; and
    all letters of said particular language being displayed on said body, one of said letters on each flat exterior surface.

* * * * *

UNITED STATES PATENT AND TRADEMARK OFFICE
CERTIFICATE OF CORRECTION

PATENT NO. : 5,947,741
DATED : September 7, 1999
INVENTOR(S) : Gerard L. Villarreal It is certified that error appears in the above-identified patent and that said Letters Patent is hereby corrected as shown below:

The Title page should be deleted and substitute therefor the attached Title page.

Figure 2:
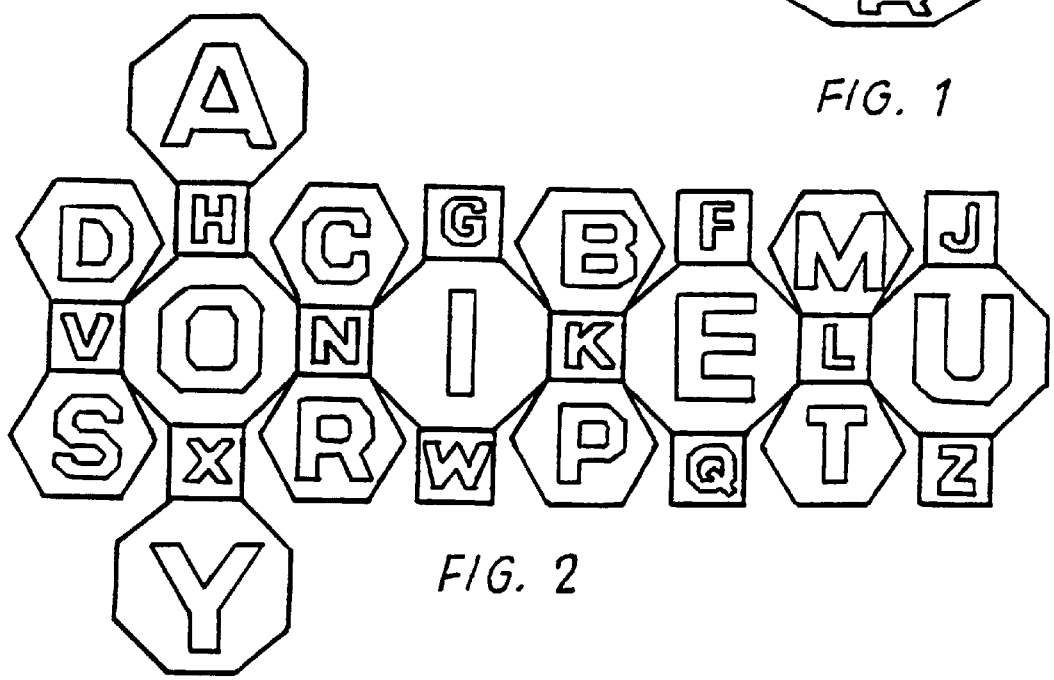
FIG. 2 is a diagrammatic view of letters which are displayed on different surfaces of the embodiment of FIG. 1.
Figure 3:
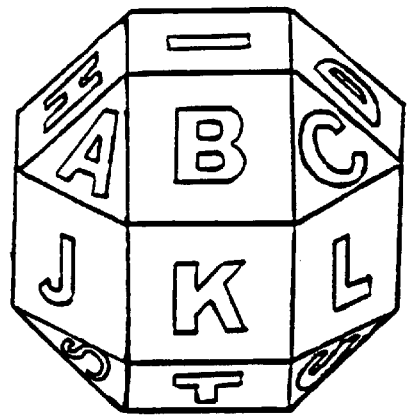
FIG. 3 is a perspective view of the present invention having a small rhombicuboctahedron shape or rhombicuboctahedron.
Figure 4:
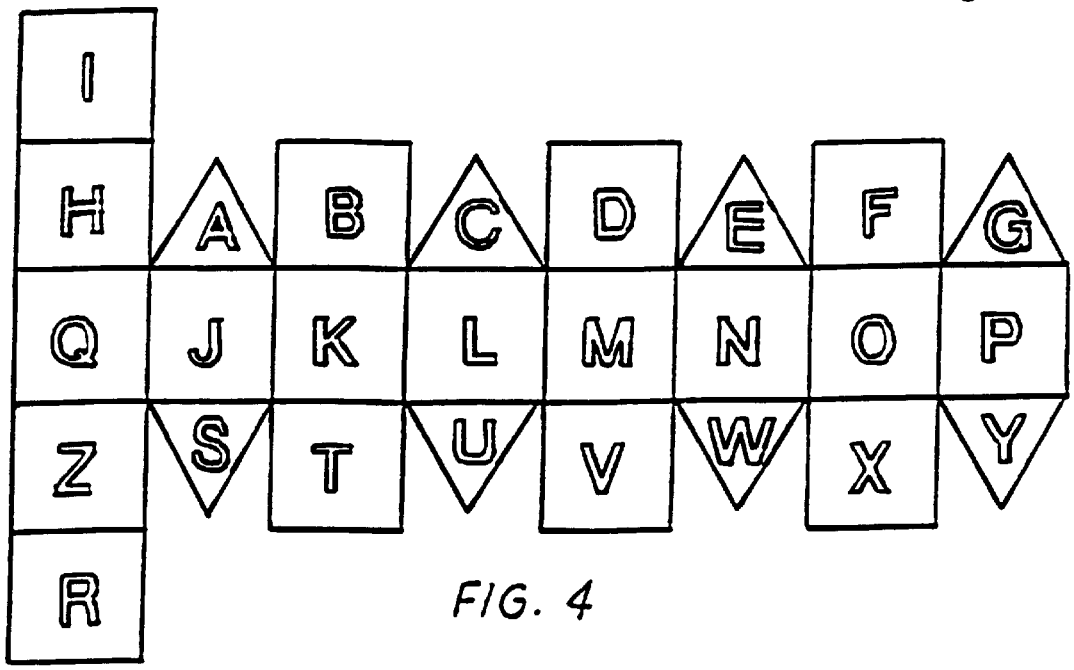
FIG. 4 is a diagrammatic view of letters which are displayed on different surfaces of the embodiment of FIG. 1.

Drawings:

Delete Drawing sheets 1-2 and substitute therefor the Drawing sheets consisting of Figs. 1-2, as shown on the attached pages.

Signed and Sealed this

Twenty-sixth Day of September, 2000

Attest:

Q. TODD DICKINSON

*Attesting Officer*  *Director of Patents and Trademarks*

United States Patent

Villarreal

[11] Patent Number: 5,947,741
[45] Date of Patent: Sep. 7, 1999

[54] TWENTY-SIX SIDED GAME BALL

[76] Inventor: Gerard L. Villarreal, 10343 Sahara, San Antonio, Tex. 78216

[21] Appl. No.: 08/948,689

[22] Filed: Oct. 10, 1997

Related U.S. Application Data

[60] Provisional application No. 60/028,629, Oct. 16, 1996.

[51] Int. Cl.$^6$ .................................................. G09B 1/36
[52] U.S. Cl. .......................................... 434/171; 434/159
[58] Field of Search ............................ 434/128, 171, 434/172, 174, 159; 273/146; 446/122

[56] References Cited

U.S. PATENT DOCUMENTS

| | | |
|---|---|---|
| 217,978 | 10/1879 | Hill . |
| 1,477,255 | 12/1923 | Fritz . |
| 1,586,429 | 5/1926 | Kiesling . |
| 3,391,476 | 7/1968 | Sher . |
| 3,811,206 | 5/1974 | Gaccetta ........................ 434/159 |
| 3,858,333 | 1/1975 | Kopp ............................ 373/146 X |
| 3,873,096 | 3/1975 | Shoptaugh . |
| 4,055,348 | 10/1977 | Marzoni, Jr. . |
| 4,188,734 | 2/1980 | Rich ............................... 434/159 |
| 4,258,479 | 3/1981 | Roane . |
| 4,378,117 | 3/1983 | Rubik . |
| 4,437,667 | 3/1984 | Miller . |
| 4,936,780 | 6/1990 | Cogliano . |
| 4,950,165 | 8/1990 | Machaalani . |
| 5,013,245 | 5/1991 | Benedict . |
| 5,167,503 | 12/1992 | Jordan . |
| 5,224,710 | 7/1993 | Feokhari ........................ 273/247 |
| 5,275,567 | 1/1994 | Whitfield . |
| 5,337,501 | 8/1994 | Amanze . |
| 5,405,135 | 4/1995 | Embro . |
| 5,716,212 | 2/1998 | Lee ............................... 434/159 |

Primary Examiner—Kien T. Nguyen
Attorney, Agent, or Firm—Royston, Rayzor, Vickery, Novak & Druce, L.L.P.

[57] ABSTRACT

A game piece for language related play having a plurality of flat exterior surfaces that are equal in number to the number of letters in the alphabet of a particular language. All of the letters of the particular language are displayed on the body so that one letter is on each flat exterior surface. Optionally, a corresponding braille character and/or a corresponding sign-language character may be displayed adjacent to each letter on the same flat exterior surface. In one embodiment, the language is English and the plurality of flat exterior surfaces number twenty-six.

19 Claims, 2 Drawing Sheets